Feb. 14, 1956     C. B. STADUM     2,735,006
AUTOMATIC TIMING SYSTEM

Original Filed Jan. 10, 1948     4 Sheets-Sheet 1

INVENTOR
Clarence B. Stadum.
BY
Hymen Diamond
ATTORNEY

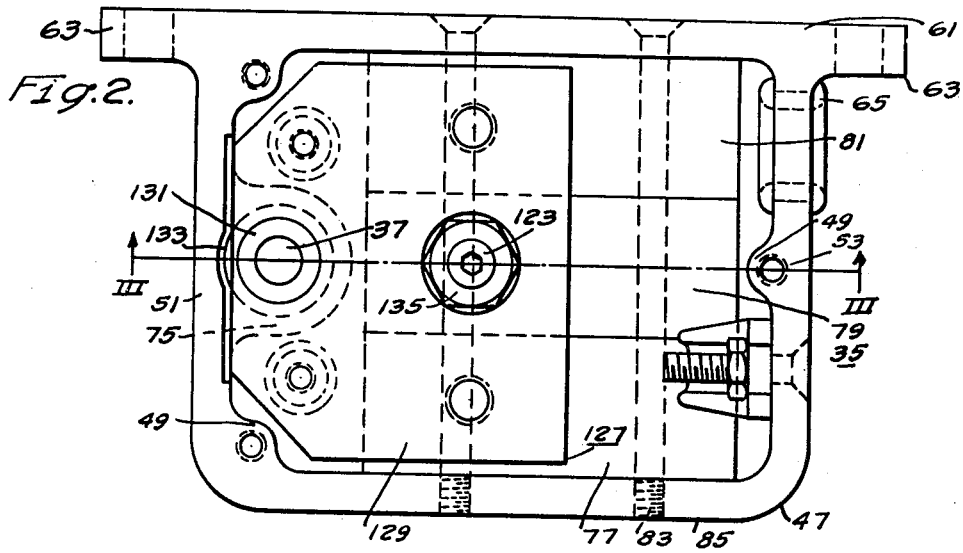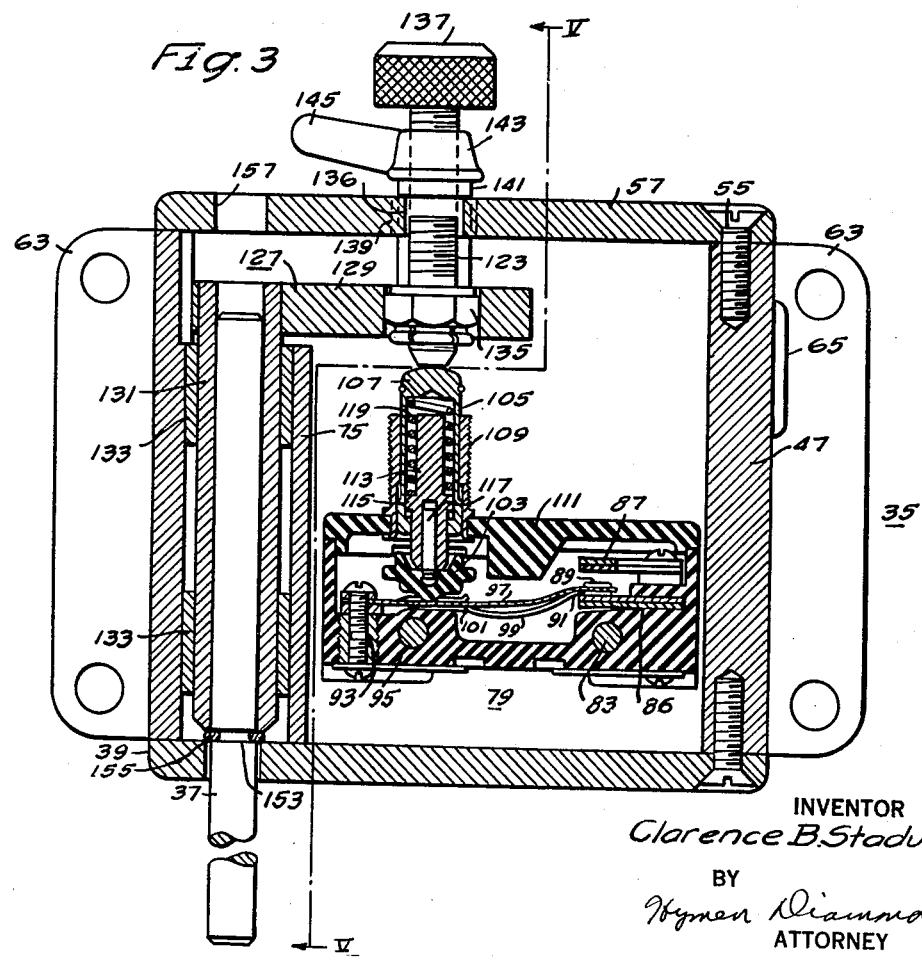

Feb. 14, 1956

C. B. STADUM 2,735,006

AUTOMATIC TIMING SYSTEM

Original Filed Jan. 10, 1948

INVENTOR
Clarence B. Stadum.

BY
Hymen Diamond.
ATTORNEY

Feb. 14, 1956      C. B. STADUM      2,735,006
AUTOMATIC TIMING SYSTEM
Original Filed Jan. 10, 1948      4 Sheets-Sheet 4
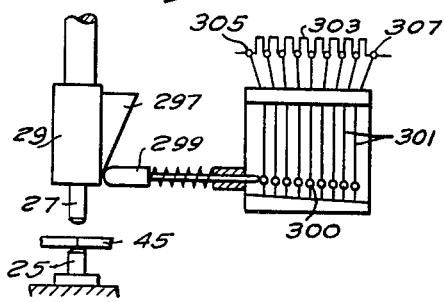
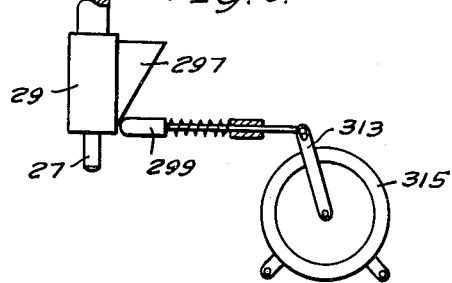
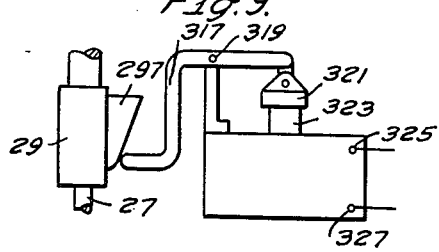
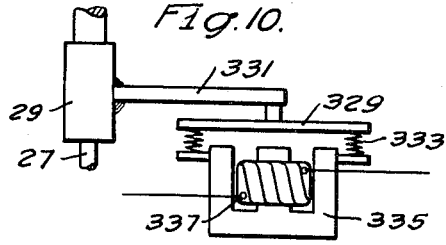
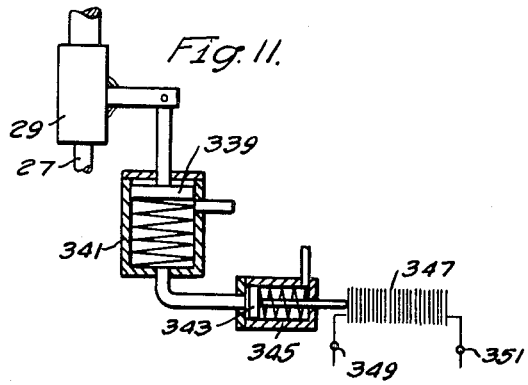
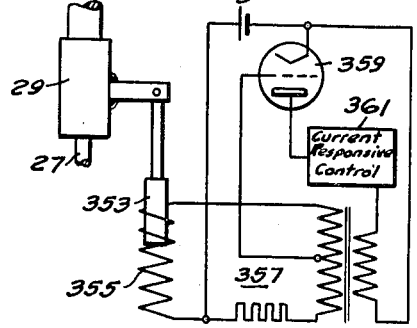
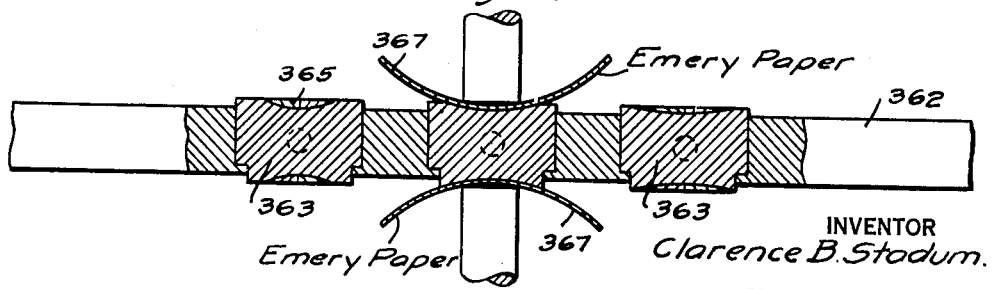
INVENTOR
Clarence B. Stadum.
BY
Hymen Diamond.
ATTORNEY

United States Patent Office 2,735,006
Patented Feb. 14, 1956

2,735,006
AUTOMATIC TIMING SYSTEM

Clarence B. Stadum, Buffalo, N. Y., assignor to Westinghouse Electric Corporation, East Pittsburgh, Pa., a corporation of Pennsylvania Original application January 10, 1948, Serial No. 1,523. Divided and this application October 2, 1951, Serial No. 249,377

3 Claims. (Cl. 250—27)

My invention relates to control apparatus and methods and it has particular relation to apparatus and methods for welding materials of different thicknesses. This application is a division of application Serial No. 1523, filed January 10, 1948, now Patent No. 2,594,090, issued April 22, 1952, and assigned to Westinghouse Electric Corporation.

My invention is particularly applicable to resistance welding systems in which the material to be welded is clamped between welding electrodes, and current is transmitted through the material for a predetermined time interval, the length of which is dependent on the properties of the material and particularly on its thickness. Experience has demonstrated that, to produce satisfactory welds, the time interval during which welding current flows should increase as a function of the thickness of the material welded. Where materials of different thickness are to be welded this requirement presents difficulties. It is not practicable to segregate the materials to be welded in accordance with their thicknesses and to weld the material of each thickness in its turn, resetting the timing with the change in the material to be welded. The segregating operation and the tools which it requires are costly in the few situations where it could be carried out. In most situations, the materials to be welded are not available for segregation. This condition arises for example where a welder is installed as a component of a production line, and parts of different thickness to be welded arrive from a preceding stage in the line.

It is accordingly an object of my invention to provide welding apparatus, for producing satisfactory welds of materials of different thickness, of the type in which the timing of the flow of welding current through a material to be welded shall be controlled automatically in accordance with the material thicknesses.

Another object of my invention is to provide a method of satisfactorily welding materials of different thicknesses which shall lend itself readily to practice in a high speed production line.

A further object of my invention is to provide a method of satisfactorily welding materials of different thicknesses in the practice of which manual resetting of the welding current-time for different thicknesses shall not be required.

Still another object of my invention is to provide a method of welding materials of different thicknesses without segregating the materials in accordance with their thicknesses.

A general object of my invention is to provide a welding control system particularly suitable for use in a high speed production line through which materials of different thicknesses flow.

A specific object of my invention is to provide a method of welding steel parts of different thicknesses without manually resetting the timing of the welding current.

Another specific object of my invention is to provide a thickness gauge adapted to cooperate with welding equipment and to set readily the welding current time in accordance with the thickness of the material to be welded.

An incidental object of my invention is to provide a tool for tipping welding electrodes used in the practice of my invention.

The properties of a weld are determined by a multitude of conditions many of which are beyond the control of the operator. There are, however, a few which can be set by the operator and which have an important bearing on its soundness. Of the latter, the principal factors are the pressure applied to the material during the welding operation, the dimensions of the welding electrode tips, the magnitude of the welding current transmitted through the material and the time during which the welding current flows.

My invention arises from the realization, as the result of extensive experimental investigation, that materials of different thicknesses over a wide range of thicknesses may be welded satisfactorily by varying only the duration of the flow of welding current in accordance with the thickness while maintaining the pressure exerted by the electrodes, the tip dimensions of the electrodes and the magnitude of the welding current constant. I have found that the welding electrode tip dimensions and the magnitude of the welding current are each functions only of the welding electrode pressure. The pressure required for sound welds determined as a function of a selected maximum thickness, is satisfactory over a wide range of smaller thickness and with this parameter fixed, the time duration of the welding current which is required for the production of a sound weld is in itself a function of the thickness.

The experiments on which my invention in its specific aspects is based were conducted principally with steel. However, the principles which I have derived from these experiments are applicable to materials of other types. For steel, I have found that to achieve a weld of the highest degree of soundness, the smallest electrode force $F_s$ which must be applied may be expressed as a function of the thickness of a single sheet as follows:

$$F_s = 31800 \, t^2(1 + t^{-1/2})$$

Except in rare instances, industry does not demand the highest degree of soundness; welds which do not reach this quality are acceptable. The smallest electrode force $F$ which must be applied to produce an acceptable weld is given by $$F = 28000 \, t^{3/2}$$

I have found further that with a force $F$ determined for a given maximum thickness $t$ impressed by the electrodes, the materials which may be welded satisfactorily may vary in thickness over a range of 6 to 1 from $t$ to $t/6$.

The dimensions of the welding electrode tips are a function of $F$. The flat end diameter $d$, the angle of taper $A$ and the spherical radius $R$ of the electrode tips may be expressed as a function of $F$ as follows:

$$d = .00796 F^{1/2}$$

$$A = \tan^{-1} \frac{F^{1/16}}{30 F^{1/16} - 73.3}$$

$$R = .0234 F^{2/3}$$

The welding current $I$ may be expressed as a function of the force $F$ as follows:

$$I = (137000 \, F^{1/2} + 13880 F + 285 F^{2/3})^{1/2}$$

With the electrode force $F$, fixed, and the electrode tip dimensions and the current determined as a function of the force, the welding time expressed in terms of cycles $N$ of a 60-cycle welding supply is given in terms of the thickness $t$ as follows:

$$N = 200t + 1440t^2 + 5760t^3$$

The above equations were derived empirically from many experiments conducted with steel. Similar equations may be derived empirically for other materials. The basic principles of my invention are as applicable to such other materials as they are to steel. My invention in its broader aspects extends to any material.

In the practice of my invention, the electrode force for welding materials over a wide range of thickness is determined from the equation for F if the materials are of steel, or from an analogous equation if the materials are of other metals. The thickness $t$ selected for calculating F is one-half the thickness of the thickest joint to be welded. Once F is determined, the electrode tip dimensions and the welding current magnitude I may be derived from F. In conducting the welding operation the electrode tip dimensions, F and I, are maintained constant and the duration of the welding current for each weld is varied. Customarily, the welding current is derived from a 60-cycle commercial supply. The duration is in such a situation determined from the equation for N. If the supply is not of the 60-cycle type, a suitable equation for the frequency in question may be derived.

In practicing my invention, I also provide a suitable gauge responsive to the thickness of the mateiral which is, at any time, inserted between the welding electrodes. The gauge cooperates with the timing system of the welder and sets the timing in accordance with its response. In accordance with a specific aspect of my invention, the gauge response need not be a continuous function of the thickness. The gauge may be designed to operate only at selected limiting thicknesses.

In certain situations the range of thickness over which a system according to my invention operates can be increased by varying the current I as well as the time (N). Under such circumstances the thickness gauge can be conneted to vary the heat control, that is, the current I, as well as the time systems in which such variations are available are within the scope of my invention. Under certain circumstances the force F may also be varied, however not at random, but as a specific function of predetermined properties of the material.

My invention is conceived primarily to serve to produce satisfactory welds over a wide range of material thicknesses. However, it has other applications. During a welding operation, the material welded becomes soft and tends to collapse under the pressure of the welding electrodes. I have found that the extent of the collapse may serve as a criterion of the quality of the weld produced. Sound welds may be produced by observing when the collapse has reached a predetermined point and at this instant discontinuing the flow of welding current. Since the control system in accordance with my invention operates in response to the thickness of the material between the welding electrodes, this sysem may be utlized to interrupt the welding current when the material between the electrodes has collapsed to the propitious thickness.

The novel features that I consider characteristic of my invention are set forth with particularity in the appended claims. My invention itself, however, both as to its organization and its method of operation, together with additional objects and advantages thereof, will best be understood from the following description of specific embodiments when read in connection with the accompanying drawings, in which:

Fig. 2 is a view in top elevation of a thickness gauge embodying a specific aspect of my invention;

Fig. 3 is a view in section taken along line III—III of Fig. 2;

Fig. 7 is a diagrammatic view showing a modification of my invention;

Fig. 8 is a diagrammatic view showing another modification of my invention;

Fig. 9 is a diagrammatic view showing a further modification of my invention;

Fig. 10 is a diagrammatic view showing a still further modification of my invention;

Fig. 11 is a diagrammatic view showing still another modification of my invention;

Fig. 12 is a diagrammatic view showing a still further modification of my invention; and Fig. 13 is a view partly in section and partly in side elevation showing a tool for grinding electrode tips utilized in the practice of my invention to the proper dimensions.

Figure 1:
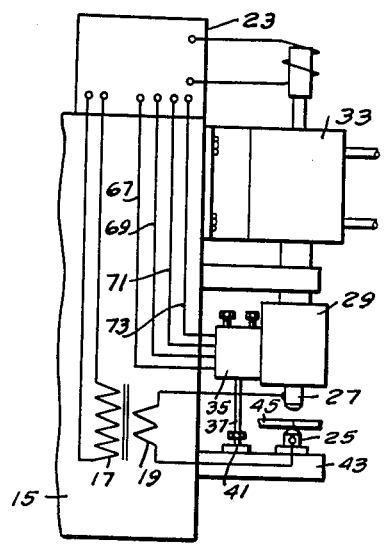
Figure 1 is a view partly in side elevation and partly diagrammatic of a welding system in accordance with my invention.
Figure 5:
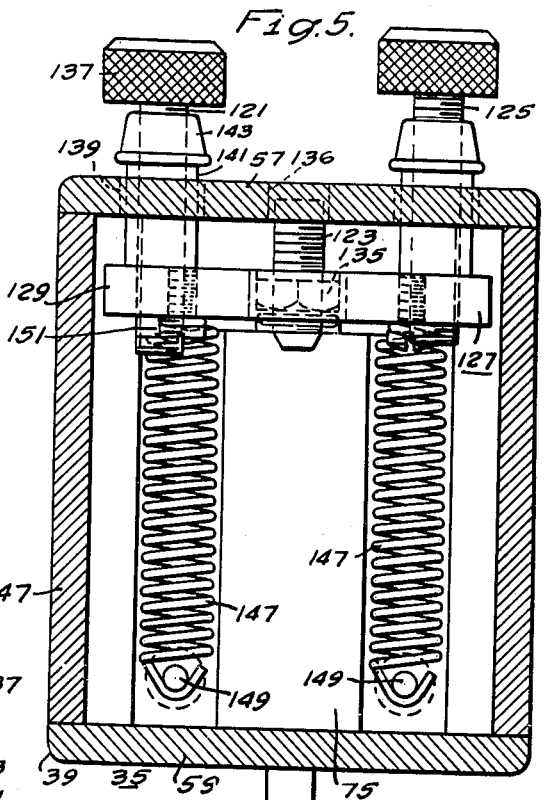
Fig. 5 is a view in section taken along line V—V of Fig. 3.
Figure 4:
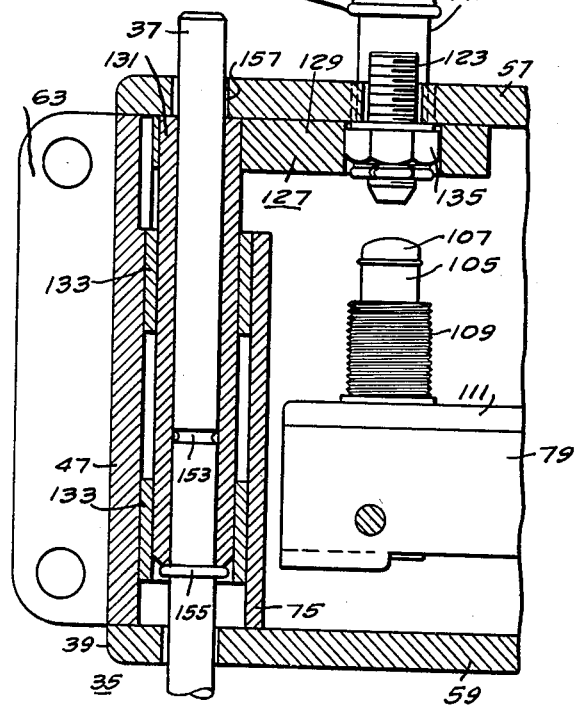
Fig. 4 is a partial view in section similar to Fig. 2 and showing the gauge in a different position than it is shown in Fig. 3.
Figure 6:
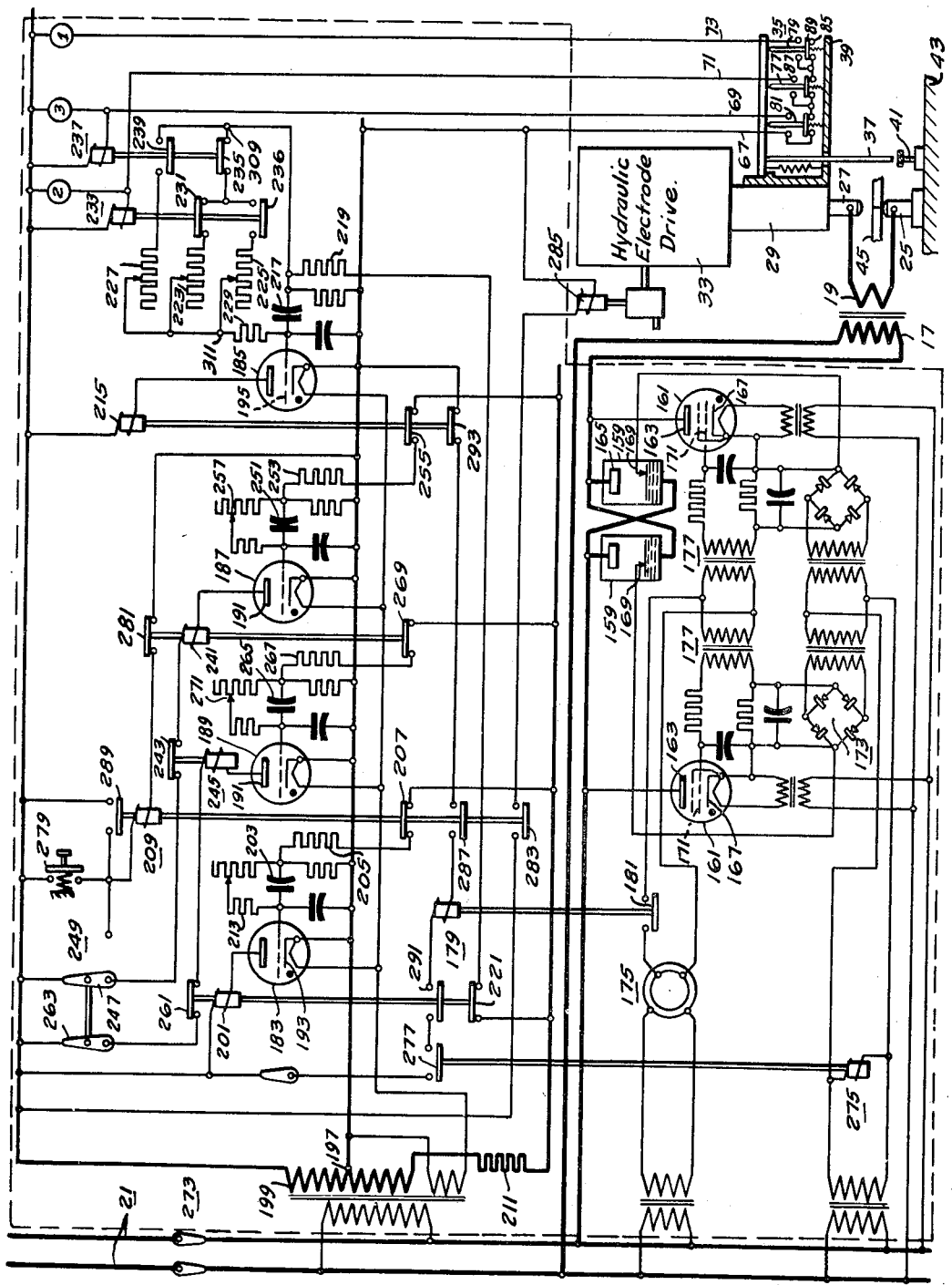
Fig. 6 is a diagrammatic view showing a control circuit in accordance with my invention.

The apparatus shown in Figs. 1 to 6 comprises a welding transformer mounted in a casing 15. In Figs. 1 and 6, the transformer is shown schematically. It includes a primary 17 and a single or double turn secondary 19. Systems including welding transformers with multiple winding primaries lie within the scope of my invention. The primary 17 is supplied from power buses 21 through a timer 23. Welding electrodes 25 and 27 are connected across the secondary 19. The lower electrode 25 is fixed and the upper electrode 27 is mounted in a block 29 which is movable upwardly and downwardly preferably by operation of a hydraulic system 33. Customarily such a hydraulic system comprises a compressed air supply and the usual solenoid operated inlet and outlet valves. In accordance with the broader asepects of my invention the block 29 may be electromagnetically or spring operated. The operation may be such for example that the pressure is a predetermined function of thickness, current or other property of the welding system.

A thickness gauge 35 is suspended from a face of the block 29 perpendicular to the face to which the welding electrode 27 is secured. The thickness gauge is provided with a feeler rod 37 which is held resiliently in its lowermost position in the gauge container 39. When the block 29, the movable electrode 27 and the gauge 35 are moved downward, the feeler rod engages the top of an adjustable screw 41 mounted on the fixed electrode support 43. After the rod 37 has just contacted the screw 41, the rod is urged upward relative to the gauge container 39 by the screw as the electrode assembly 27, 29, 39 continues to moves downward. The extent of the upward movement of the rod is determined by the thickness of the material 45 to be welded which is interposed between the electrodes 25 and 27.

The thickness gauge container 39 is in the form of a rectangular parallelopiped. The body 47 of the container is cast in one piece. Internal bosses 49 are cast integral with one side 51 of the body and centrally with the opposite side 53 and into these bosses screws 55 securing the top 57 and base 59 of the container to the body are inserted. From the rear wall 61 of the body perforated ears 63 extend; by means of these ears the body is secured to the electrode block 29. The side 53 of the single boss 49 is provided with an opening having a rubber grommet 65 through which connecting cables 69, 67, 71 and 73 may be threaded. From the opposite side 51, an elongated boss 75 substantially larger than the screw bosses 49 projects centrally. This boss is in the form of a hollow cylinder.

Within the body 47 spaced a short distance from the base 59, a plurality of snap switches 77, 79 and 81 are mounted with their bodies parallel to the base. The snap switches extend across the width of the body 47 and are mounted therein on a pair of screws 83 which extend from the back wall 61 to the front wall 85 of the body through openings in the snap switches.

This material 45 to be welded is ordinarily of relatively small thickness of the order of hundredths or even thousandths of an inch. The differences in thickness on which the operation of the gauge 35 depends are, therefore, relatively small. The snap switches 77, 79 and 81 should, therefore, be designed to respond to small differences in pressure or small movements. In the practice of my invention, micro switches as manufactured by the Micro Switch Corporation of Freeport, Illinois, may be used. A suitable switch is shown on page 6 of the Micro Switch Corporation Catalog No. 70.

Each of the snap switches 77, 79 or 81 comprises a pair of fixed contacts 86 and 87 respectively and a movable contact 89 which may be actuated to engage either of the fixed contacts. The movable contact 89 is suspended from a spring 91 having a cantilever support from a screw 93 secured to the base 95 of the switch. The spring is composed of a central elongated strip 97 and a pair of short arms 99 which join in a shoulder to which the movable contact 89 is secured. The short arms 91 of the spring are held in compression by engagement in a V bracket 101. Downward pressure of a spring actuated plunger head 103 causes the movable contact 89 to engage the lower fixed contact 86. When this pressure is decreased by a movement of the plunger head 103 over a short distance of the order of a thousandth or a hundredth of an inch, the movable contact 89 snaps into engagement with the upper fixed contact 87. The plunger of the switch is of composite structure, and comprises a tubular shell 105 having inwardly extending flanges and closed by a button 107. The shell is mounted slidably within an outer shell 109 secured in the cover 111 of the switch. Within the tubular member a rod 113 flanged intermediate its ends is slidably mounted. The flange 115 of the rod engages the side wall of the inner shell 105. From the projecting end of the rod a pin 117 extends; the pin carries the plunger head 103. The button 107 is resiliently urged away from the cantilever spring 91 by a coil spring 119 which encircles the rod 113 engaging the flange 115 at one end and the inner face of the button at the other. The plunger head 103 may be moved into engagement with the cantilever spring 91 and its pressure on the spring may be increased by pressing downwardly on the button 107.

The position of the button 107 of each switch 77, 79 is determined by a plurality of adjustable screws 121, 123 and 125 respectively mounted in a bracket 127. The bracket 127 is in the form of a hoe and comprises a plate 129 from the center of one end of which a hollow tubular projection 131 extends. The plate has a length somewhat smaller than the width of the body 47. Its width is equal approximately to half the length of the body. The bracket 127 is mounted in the container with the projection 131 extending slidably into the cylindrical boss 75, and its outer surface engaging bearings 133 in the boss. Each of the screws 121, 123, 125 screws into a nut 135 mounted in a hole in the plate 129. The position of the screws may be set by screwing them in or out of the nut 135.

The screw 123 associated with the central switch 79 screws into a nut centrally disposed in the plate 129 of the bracket 127. This screw is headless and is provided at the top with a hexagonal opening into which a wrench (not shown) may be inserted. The length of the screw is such that it extends below the top 57 of the container 35. The wrench may be inserted through an opening 136 in the top coextensive with the screw. Preferably, the screw is preset at the factory to a position such that the corresponding switch button is compressed when the movable welding electrode 27 is in engagement with the fixed welding electrode 25. This setting is designed for the welding of the thinnest material.

The screws 121 and 125 associated with the other switches 77 and 81 respectively have knurled heads 137 and are screwed into nuts 135 secured in the plate 129 through openings 139 in the top 57. Each of the screws 121 and 125 is provided with a locking mechanism. The latter comprises a cylindrical shell 141 and a lock nut 143 having a projection 145. The nut 143 is screwed on each screw to a position near its head 137; the shell 141 is slipped on below the nut. The assembly is then screwed into the nut 135 in the plate 129. The outside diameter of the shell 141 is smaller than the diameter of the hole 139 in the top 57. Each screw 121, 125 is then screwed down to the desired position and locked by screwing the lock nut 143 to a position such that the shell 141 engages the plate 129.

The bracket 127 is held in a downward position, so that the screws 121, 123 and 125 which it carries compress the corresponding buttons 107 of the switches 77, 79 and 81 respectively, by heavy helical springs 147 disposed on opposite sides of the boss 75. Each of the springs 147 is secured to a screw 149 extending from the adjacent side wall 51 of the body 47 near the base 59 and to a screw 141 extending from the plate 129.

The feeler rod 37 is cylindrical and is dimensioned to slide within the projection 131 of the bracket 127. The rod is provided with a peripheral groove 153 intermediate its ends. Within the groove a relatively heavy circular spring 155 is held. The rod 37 is slipped into the bracket projection 131 to a point at which the circular spring 155 engages the extending edge of the projection 131. Further movement of the rod 37 tends to cause the projection and the bracket to move upwardly. As the feeler rod 37 is pressed down on the screw 41 on the fixed electrode support 43 by the downward movement of electrode block 29 it moves upwardly relative to the container 35 by the head of the screw 41 and it carries with it the bracket 127. The bracket in turn carries the screws 121, 123, 125 away from the buttons 107 of the switches 77, 79, 81, causing the latter to snap to different positions from the ones in which they are originally set.

The screws 121, 123, 125 may be set by trial and error so that only the switch 79 in the center is in the lower position when material 45 of the smallest thickness is to be welded, two of the switches 77 and 79 are in the lower position for materials of an intermediate thickness preselected experimentally and all switches are in the lower position for the thickest material.

In the event that force exceeding the holding force of the circular spring 155 is impressed on the rod 37, the spring is disengaged from its groove by the reactive force exerted by the edge of the bracket projection 131 and may move upwardly. To permit free movement of the rod, an opening 157 is provided in the top 57 of the container. This feature has an important function in the ordinary use of the gauge. Frequently, the operator of a welding machine, in a playful mood or by inadvertence, projects the electrode lever 31 downward in the absence of a material 45 on the lower electrode 25, or in the absence of a lower electrode. Under such circumstances, the feeler rod 37 is urged to move upwardly relative to the container 35 a relatively great distance. If the rod carried with it the bracket 127, it would cause the bracket to strike against the top 51 with substantial force, damaging the top or the rod. In the gauge disclosed, the circular spring 155 yields on excessive movement of the feeler rod, the rod moves through the top 57 of the container and damage is avoided.

The switches 77, 79 and 81 are connected to the timer 21 to control the timing of the welding operation. The connection may be of any general type and in general depends on the character of the timer. A typical timing system including the switches is shown diagrammatically in Fig. 6. The system includes a pair of ignitrons 159 connected in antiparallel between the power supply buses 21 and the primary 17 of the welding transformer. Firing current is supplied to the ignitrons through a pair of thyratrons 161. The anode 163 of each of the thyratrons is connected to an anode 165 of a corresponding ignitron; the cathodes 167 of the thyratrons are connected each to the corresponding ignitors 169. Each of the thyratrons is maintained normally non-conductive by a bias impressed between its control electrode 171 and its cathode 167 from a rectifier 173 supplied from the buses 21. Each thyratron is in its turn rendered conductive by potential derived from the main buses through a phase shifter 175 and a transformer 177. The output circuit of the phase shifter is controlled by a relay 179, the contacts 181 of which are maintained open when the thyratrons 161 are to be non-conductive.

The operation of the system is controlled from a plurality of thyratrons 183, 185, 187 and 189 respectively connected to time its various sequential operations. Each of these thyratrons comprises an anode 191, a cathode 193 and a grid 195. The cathodes 193 of the thyratrons 183, 185, 187 and 189 are connected together to an intermediate tap 197 of a secondary section 199 of a transformer energized from the buses 21.

The first thyratron 183 controls the so-called "Squeeze" time, that is, the time during which the work 45 is compressed between the electrodes 25 and 27 before current flows. The anode 191 of this thyratron is connected through the exciting coil 201 of a "Squeeze" time relay to the upper terminal of the secondary 199. The control electrode 195 of the thyratron 183 is connected to the lower terminal of the secondary 199 through a capacitor 203, a resistor 205, normally closed contacts 207 of the welder solenoid relay 209 and a second resistor 211. During the half periods of the power supply during which the anode 191 of the "Squeeze" thyratron 183 is electrically negative relative to the cathode 193, the control electrode 193 is electrically positive and current is conducted to charge the capacitor 203 to a potential such as to maintain the start control electrode electrically negative relative to the cathode. Under such circumstances, the "Squeeze" thyratron 183 remains non-conductive when its anode 191 subsequently becomes positive relative to its cathode. The capacitor is shunted by a voltage divider 213.

The second thyratron 185 controls the "Weld" time, that is, the time during which welding current flows. Its anode 191 is connected to the upper terminal of the secondary 199 through the exciting coil 215 of the welding relay. Its control electrode 195 is connected to the lower terminal of the secondary 199 through a capacitor 217, a resistor 219, normally closed contacts 221 of the "Squeeze" relay and the resistor 211. This capacitor 217 is charged by flow of grid current to a potential such as to maintain the weld thyratron 185 non-conductive. One of a plurality of shunt networks, each including a voltage divider 223, 225, or 227, may be selectively connected across the capacitor 217. The selection of these shunt networks is controlled from the snap switches 77, 79 and 81 respectively of the thickness gauge. With the buttons 107 of all snap switches 77, 79, 81 compressed and their movable conductors in the lower position the shunting network across the weld time capacitor 217 includes a resistor 229, the central voltage divider 223, normally closed contacts 231 of a first relay 233 and normally closed contacts 235 of a second relay 237. This condition exists when the material 45 to be welded has the maximum thickness. If material of thickness corresponding to the setting of the intermediate snap switch 77 is disposed between the electrodes 25 and 27, the intermediate switch snaps to its upper position 89—87 and, a circuit is closed which extends from the upper terminal of the secondary 199 through the exciting coil of the first relay 233, the upper contacts 87 of the switch 77, the lower contacts 89 of the central switch 79 to the intermediate tap 197 of the secondary. The first relay 233 picks up; its normally closed contacts 231 open, opening the shunt circuit through the central voltage divider 223, and its normally open contacts 236 close, closing the shunt circuit through the lower voltage divider 225. If the material disposed between the electrodes has a thickness smaller than that corresponding to the setting of the intermediate thickness switch 77, the switch 81 set for the thickest material snaps from the lower position 89—85 to the upper position 89—87. A circuit now closes through the exciting coil of the second relay 237, the switch contacts 87, to the intermediate tap 197 of the transformer. The normally open contacts 239 of the second relay 237 close, closing a shunt circuit through the third voltage divider 227 and the normally closed contacts 235 of the second relay open, opening circuits through the other voltage dividers 223 and 225.

The third thyratron 187 is connected to time the so-called "Hold" operation, that is, the time interval during which the welding electrodes 25 and 27 are held in engagement with the material after termination of the flow of welding current. The anode 191 of the hold thyratron 187 is connected to the upper terminal of the secondary through the exciting coil 241 of the hold relay, normally closed contacts 243 of a relay 245 associated with the "Off" thyratron 189 and one of the contacts 247 of a selector "Repeat"-"Non-Repeat" switch 249 which sets the system for repeat or non-repeat operation. In the system as shown in the drawing, the selector switch 249 is set for repeat operation. The grid 195 of the "Hold" thyratron 187 is connected to the lower terminal of the secondary through a capacitor 251 through a resistor 253 and through normally closed contacts 255 of the "Weld" relay. The capacitor is shunted by a voltage divider 257 as is the capacitor 203 of the "Squeeze" thyratron.

The fourth thyratron 189 is connected to time the "Off" operation, that is, time interval during which the welding operation is discontinued so that the material 45 may be reset. The anode 191 of the "Off" thyratron 189 is connected to the upper terminal of the secondary through the exciting coil of the off relay 245, normally closed contacts 261 of the "Squeeze" relay and a contact 263 of the selector switch 249. The grid 195 of the thyratron 189 is connected to the lower terminal of the secondary through a capacitor 265, a resistor 267 and normally closed contacts 269 of the "Hold" relay. The capacitor 265 is shunted by a voltage divider 271 in the same manner as the "Squeeze" capacitor 203.

The system is prepared for operation by energizing the supply buses 21 in the usual manner by the closure of a switch 273 or a circuit breaker. When this switch is closed heating current is transmitted through the heaters of the thyratron cathodes 167 and 193. A time delay relay 275 is energized and, after a predetermined time interval, operates closing contacts 277 in series with the exciting coil of the firing relay 179. This circuit is, however, open at several other points and firing does not occur. The time interval of the relay 275 is sufficient to permit the cathodes of the thyratrons to attain the proper temperature for emission.

The welding operation may be initiated by closing a push button 279 or a foot switch. Current now flows through the coil of the solenoid relay 209 in a circuit extending from the upper terminal of the secondary through the push button 279, the coil of the solenoid relay, normally closed contacts 281 of the "Hold" relay, to the intermediate tap 197 of the secondary. The solenoid relay operates, closing a first set of normally open contacts 283. These contacts close a circuit through the welder solenoid coil 285, actuating the welding electrodes 25 and 27 to apply pressure to the work. A second set of normally open contacts 287 of the solenoid relay in circuit with the coil of the firing relay 179 are now closed, but this closure has no immediate effect, as the circuit is elsewhere open. A third set of normally open contacts 289 of the solenoid relay are closed across the push button 279 and lock in the solenoid relay. The normally closed contacts 207 of the solenoid relay in circuit with the capacitor 203 associated with the "Squeeze" thyratron 183 open. This capacitor 203 discharges gradually through its associated voltage divider 213 after a predetermined time interval equal to the desired "Squeeze" time the thyratron 183 becomes conductive.

Current now flows through the coil 201 of the "Squeeze" relay in a circuit extending from the upper terminal of the secondary 199 through the coil, the thyratron 183 to the intermediate terminal of the secondary. The "Squeeze" relay operates, opening the two sets of normally closed contacts 221 and 261 and closing its normally open contacts 291. The first set of now open contacts 261 opens a circuit through the exciting coil of the "Off" relay 245 and prevents its operation until the welding cycle is completed. The now closed contacts 291 close a circuit through the exciting coil of the firing relay 179 which extends from the upper terminal of the secondary 199 through the now closed contacts 277 of the time delay relay 275, the now closed contacts 291 of the "Squeeze" relay, the exciting coil of the firing relay 179, the now closed contacts 287 of the solenoid relay 209, normally closed contacts 293 of the weld relay to the intermediate terminal 197 of the secondary. The firing relay operates, closing the contacts 181 in the output circuit of the phase shifter 175 and causing the firing thyratrons 161 and their corresponding ignitrons 159 to fire. Current is now conducted through the ignitrons and through the primary 17 of the welding transformer. The resulting current induced in the secondary 19 performs the welding operation. The other now open contacts 221 of the "Squeeze" relay break the charging circuit of the capacitor 217 associated with the weld thyratron 185. The capacitor is gradually discharged through one or the other of the voltage dividers 223, 225, 227, depending on the setting of the snap switches 77, 79, 81 and the associated relays 233, 237. When the capacitor 217 has discharged to a predetermined potential, the weld thyratron 185 becomes conductive. The voltage divider 223, 225 or 227 shunting the capacitor 217 is so set as to correspond to the thickness of the material between the welding electrodes which has determined the setting of the snap switches 77, 79 or 81. If all three switches are in the down position, the time is short; if one of the switches 77 is in the up position, the time is longer; if two of the switches 77 and 79 are in the up position, the time is still longer.

When the weld thyratron 185 becomes conductive, it causes the weld relay to operate. Operation of the latter results in the opening of its two sets of normally closed contacts 255 and 293. By opening of the latter set 293 of these contacts, the circuit through the exciting coil of the firing relay 179 is opened, and the flow of welding current is interrupted. The opening of the other set 255 of these contacts results in the opening of the charging circuit of the capacitor 251 associated with the "Hold" thyratron 187. This capacitor now gradually discharges through its associated voltage divider 257 and, after a preset "Hold" interval, the "Hold" thyratron 187 becomes conductive.

When the "Hold" thyratron conducts, it causes the "Hold" relay to operate and to open its two sets of normally closed contacts 269 and 281. The opening of the first set of contacts opens a circuit through the coil of the solenoid relay 29, causing the latter to drop out. The lower normally open contacts 283 of the solenoid relay 209 now open, opening the circuit through the solenoid 285 to permit removal of the welded material. The second normally open contacts 287 of the solenoid relay provide a second open point in the circuit of the coil of the firing relay 179, thus permitting the normally closed contacts 293 of the weld relay to reclose when the weld thyratron 185 is subsequently rendered non-conductive. The normally closed contacts 207 and 289 of the solenoid relay 209 also reclose, the latter opening the lock-in circuit around the push button 279 and the former permitting the capacitor 203 in the grid circuit of the "Squeeze" thyratron 183 to recharge. The capacitor 203 recharges during the negative half periods of the potential supplied by the secondary and in a short time interval reaches a potential such that the "Squeeze" thyratron 183 becomes non-conductive when its anode potential becomes negative. The "Squeeze" relay 201 now drops out. Its upper normally closed contacts 261 reclose the circuit through the exciting coil of the off relay 245, its lower normally closed contacts 221 reclose the charging circuit for the capacitor 217 associated with the weld thyratron 185. Its intermediate contacts 291 open a second point in the circuit of the exciting coil of the firing relay 279. By the closing of the lower contacts 221 of the "Squeeze" relay 201, the "Weld" thyratron system is reset for operation.

The opening of the other set of normally closed contacts 269 of the "Hold" relay 241 opens the charging circuit of the capacitor 265 associated with the "Off" thyratron 189. This capacitor gradually discharges through its associated voltage divider 27 and, after a predetermined time interval, its potential reaches a magnitude at which the "Off" thyratron 189 becomes conductive. The "Off" relay 245 now operates and the opening of its normally closed contact 243 opens a circuit through the "Hold" thyratron 187 causing the latter to become deenergized and resetting the "Hold" system. By the previous closure of normally closed contacts 255 of the "Weld" relay 215 in its grid circuit, the grid circuit of the hold thyratron 187 is reset for another operation. If the push button 279 remains closed and so long as it remains closed the above described sequence is repeated.

When the system is set for non-repeat operation, one of the contacts 263 of the selector switch 249 is open, maintaining the circuit through the exciting coil of the off relay 245 open. The other contact 247 of the selector switch 249 is closed at a second fixed contact 295 to a conductor connected to the junction of the normally open lock-in contacts 289 of the solenoid relay 209 and the contacts of the push button 279. The "Off" circuit is now disconnected from the system, and the system must be reset manually by the operator.

The control system shown in Figs. 1 to 6 is designed to vary the timing at discrete transition magnitudes of the thickness of the material 45 to be welded. Material thickness responsive devices, which vary continuously or substantially continuously with the thickness of the material to be welded are within the scope of my invention and are shown in Figs. 7 to 12.

In the system shown in Fig. 7, the welding electrode block 29 has secured thereto a wedge 297. A rod 299 is urged into resilient engagement with the wedge. As the electrode block 29 is moved into engagement with the material 45, the rod 299 is moved in a direction perpendicular to the direction of movement of the electrodes to an extent dependent on the thickness of the material. At its free end, the rod engages the first of a row of silver buttons 300 suspended from springs 301, causing a number of them, dependent on the extent of its movement, to come into contact. Contact among the buttons causes turns of a resistor 303 connected to the springs 301 to be short-circuited. The resistor is connected in a timing circuit similar to the weld circuit shown in Fig. 6 in place of the dividers 223, 225 and 227. The terminals 305 and 307 of the resistor 303 may be connected to the terminals 309 and 311 respectively and the relays 233 and 237 may be omitted.

In the system shown in Fig. 8, the rod 299 is coupled to the movable contact 313 of a rheostat 315. The rheostat may be connected across the terminals 309 and 311 in a timer circuit such as is shown in Fig. 6.

In the system shown in Fig. 9, the wedge 297 on the electrode block 29 engages one end of a Z-shaped lever 317 pivoted near its center 319. The other end of the lever 317 causes the upper plate 371 of a carbon pile resistor 323 to move upward and downward. The resistance of the carbon pile is dependent on the extent of movement of the lever. The terminals 325 and 327 of the carbon pile may be connected to the terminals 308 and 311 respectively in a timer circuit such as is shown in Fig. 6.

In the system shown in Fig. 10, a plate 329 of magnetic material is suspended from the welding electrode block 29 by a rod 331 secured to the latter. As the welding electrode block moves upwardly and downwardly, the plate is moved with it against the action of a spring 333. The plate 329 closes a magnetic circuit through an E-shaped yoke 335. About the center projection of the yoke a coil 337 is connected. The upward and downward movement of the plate varies the reluctance of the coil. The coil 337 may be connected suitably in a timer circuit to vary the timing.

In the system shown in Fig. 11, a piston 339 in a large hydraulic cylinder 341 is coupled to be movable upward and downward with the electrode block 29. The movement of the piston 339 causes a smaller piston 343 in a second hydraulic cylinder 345 to move distances proportional to the distance of movement of the first piston, but substantially greater than the former. The second piston 343 is provided with a rod which compresses or relaxes a carbon pile 347, varying its resistance. The carbon pile may be connected in a timer circuit such as is shown in Fig. 6 its terminals 349 and 351 being connected to terminals 309 and 311 respectively.

In certain situations a voltage divider can replace the carbon pile 347. In such situations the movable tap of the voltage divider is actuated by the piston 343 and is connected to the suitable one of the points 349 or 351 which are in turn connected to the points 309 and 311 respectively.

In the system shown in Fig. 12, a cylinder 353 of magnetic materials moves upwardly and downwardly in a coil 355 as the welding electrode block 29 moves. The magnetic reluctance of the coil 355 is thus varied. The coil may be connected in a phase shift network 357 to shift the phase of the control potential of a thyratron 359 or other tube, thus in turn to vary the output of the thyratron 359. A current responsive control device 361 in the anode circuit of the thyratron 359 may be connected to control the timing.

In Fig. 13 a tool for shaping the tips of welding electrodes is shown. The tool comprises a rod 362 having a plurality of inserts 363. Each of the inserts 363 has impressed in its surfaces which are positioned in regions of the rod 180° apart, knurled arcuate grooves 365. The grooves of each of the blocks 363 are of different dimensions, corresponding to the different desired dimensions of the welding electrode tips. Emery paper 367 or other abrasive material is inserted in the grooves. The welding electrodes are then mounted in a jig with their tips in engagement with the emery paper. The rod 362 is grasped near its ends and rotated backward and forward in engagement with the tips of the electrodes. The electrodes are shaped by the abrasive action of the emery paper.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A timer including an electric discharge device, a circuit associated with said electric discharge device for controlling the conductivity thereof, energy storage components in said circuit, a plurality of networks to be connected to said components and when so connected controlling the charge on said energy storage components to time the conductivity and non-conductivity of said discharge device, a selector for connecting a selected one of said networks in circuit with said storage components and means responsive to a property of an operation to be timed for automatically actuating said selector to operate as aforesaid.

2. A timer including an electric discharge device, a circuit associated with said electric discharge devices for controlling the conductivity thereof, charge storing facilities in said circuit, a plurality of networks to be connected to said facilities and when so connected controlling the charge on said charge storing faciilties to time the conductivity and non-conductivity of said discharge device, a selector for connecting a selected one of said networks in circuit with said facilities and means responsive to a property of an operation being timed for automatically actuating said selector to operate as foresaid.

3. A timer including an electric discharge device having a control electrode and a plurality of principal electrodes, a capacitor between said control electrode and one of said principal electrodes, terminals for supplying potential for charging said capacitor by current flow between said control electrode and said last-named principal electrode, a plurality of adjustable impedances to be connected to said capacitor and when so connected to discharge said capacitor, a selector for connecting a selected one of said impedances to said capacitor, and means responsive to a property of an operation being timed for automatically actuating said selector to operate as aforesaid.

References Cited in the file of this patent

UNITED STATES PATENTS

| | | |
|---|---|---|
| 2,008,413 | Dawson | July 16, 1935 |
| 2,296,580 | Smiley | Sept. 22, 1942 |
| 2,315,916 | Whiteley et al. | Apr. 6, 1943 |
| 2,390,981 | Bivens | Dec. 18, 1945 |
| 2,431,284 | Stadum | Nov. 18, 1947 |
| 2,443,660 | Large et al. | June 22, 1948 |
| 2,463,985 | Linde | Mar. 8, 1949 |
| 2,533,318 | Hartwig | Dec. 12, 1950 |